United States Patent
Schmidt

(10) Patent No.: US 6,368,718 B1
(45) Date of Patent: Apr. 9, 2002

(54) STRUCTURAL STEEL ELEMENTS COATED WITH ANTICORROSIVE COATINGS AND PROCESS FOR WELDING THE SAME

(75) Inventor: Christina Schmidt, Siegen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/447,139

(22) Filed: Nov. 22, 1999

(30) Foreign Application Priority Data

Nov. 21, 1998 (DE) .......................................... 198 53 772

(51) Int. Cl.⁷ ............................................... C23F 15/00
(52) U.S. Cl. ................. 428/457; 106/14.44; 252/518.1; 252/519.3; 252/519.31; 252/519.33; 219/121.1; 219/127; 219/617; 427/318; 427/552; 427/556; 427/557; 427/558; 428/416; 428/418; 428/425.9; 428/450; 428/458; 428/461; 428/463; 428/469; 428/472; 524/439; 524/440
(58) Field of Search ............................ 106/14.41, 14.42, 106/14.44; 252/518.1, 519.3, 519.31, 519.33; 524/439, 440; 428/416, 418, 425.9, 450, 457, 458, 461, 463, 469, 472; 219/121.1, 127, 617; 427/318, 552

(56) References Cited

U.S. PATENT DOCUMENTS

| | | | |
|---|---|---|---|
| 4,119,763 A | | 10/1978 | Blair ........................... 428/563 |
| 4,256,811 A | * | 3/1981 | Black .......................... 428/562 |
| 4,734,326 A | * | 3/1988 | Nishimatsu et al. ......... 428/328 |
| 5,171,480 A | * | 12/1992 | Yoshinaka et al. .......... 252/518 |
| 5,266,105 A | * | 11/1993 | Tsuneta et al. ................ 106/16 |
| 6,126,730 A | * | 10/2000 | Yoshida et al. .......... 106/14.41 |

FOREIGN PATENT DOCUMENTS

| | | | |
|---|---|---|---|
| DE | 2202078 | | 7/1973 |
| DE | 3412234 | | 10/1985 |
| JP | 5-266720 | * | 10/1993 |
| JP | 6-136295 | * | 5/1994 |
| JP | 9-3161 | * | 1/1997 |
| JP | 9-234820 | * | 9/1997 |

* cited by examiner

*Primary Examiner*—Anthony Green
(74) *Attorney, Agent, or Firm*—W. F. Fasse; W. G. Fasse

(57) ABSTRACT

An anti-corrosive coating for structural steel components contains 3 to 80 wt. % of a binder including polymeric material, and 20 to 97 wt. % of a filler including semiconductive elements or compounds. A process for welding a steel component coated with such an anti-corrosive coating involves temporarily energizing the semiconductive material of the coating into its conductive state and then carrying out the welding process, e.g. electric spot welding, while the semiconductive material is in the conductive state. Thereby, the coating does not hamper the electric welding operation. The step of energizing the semiconductive material is achieved by temporarily applying an external energy such as localized heating or incident light radiation having a photon energy corresponding to an energy band gap of the semiconductive material.

22 Claims, No Drawings

STRUCTURAL STEEL ELEMENTS COATED WITH ANTICORROSIVE COATINGS AND PROCESS FOR WELDING THE SAME

PRIORITY CLAIM

This application is based on and claims the priority under 35 U.S.C. §119 of German Patent Application 198 53 772.7, filed on Nov. 21, 1998, the entire disclosure of which is incorporated herein by reference.

FIELD OF THE INVENTION

The invention relates to a corrosion protection or anti-corrosive coating for surface protection of structural steel components, and to a process for welding a component provided with such a coating.

BACKGROUND INFORMATION

When carrying out electric spot welding for joining two steel plates protected by a polymeric anti-corrosive coating, the welding process is often impaired by the electrical insulating effect of the polymeric coating. Thus, attempts have been made in the art to develop effective anti-corrosive coatings that will not impair the weldability characteristics of the steel component provided with the coating.

An anti-corrosive coating based on zinc-iron-phosphide fillers is known from U.S. Pat. No. 4,119,763. The zinc content of the fillers is partly replaced by non-metallic inhibitors such as zinc yellow in order to improve the weldability of the thus coated steel surface. However, the metallic conductivity of these coatings interacting with the underlying metal leads to the formation of voltaic cells which promote corrosion. Therefore it is additionally necessary to deposit an electrical insulating layer to suppress this formation of voltaic cells.

German Patent Publication 34 12 234 A1 discloses an anti-corrosive primer of which the filler may contain semi-conductive compounds. Although the semiconductive compounds suppress the production of voltaic cells, the material has an insufficient conductivity and thus reduces the weldability.

German Patent Laying-Open Publication 2,202,078 discloses an anti-corrosive coating material, which contains oxidized semiconductive compounds for binding hydrogen that evolves during welding due to the decomposition of the binding agents. Although this prevents the formation of blowholes and of pores, the weldability is severely limited, just as in the cases described above.

SUMMARY OF THE INVENTION

In view of the above, it is an object of the invention to provide an anti-corrosive coating for steel components that does not hinder the welding of such coated components, and a process for welding structural steel components that have such an anti-corrosive coating for surface protection. The coatings should be easily weldable along with the steel substrate during the welding process, and after the welding operation the coatings should continue to provide good protection against corrosion while preventing the formation of voltaic cells. The invention further aims to avoid or overcome the disadvantages of the prior art and to achieve additional advantages, as apparent from the present specification.

The above objects have been achieved according to the invention in an anti-corrosive coating including at least one coating layer that consists essentially of from 3 wt % to 80 wt % of a binder and from 20 wt % to 97 wt % of a filler, wherein the binder comprises a polymeric material and the filler comprises a filling agent and a semiconducting material. The semiconducting material may comprise one or more elemental semiconductors such as silicon or germanium, or one or more compound semiconductors such as a titanium oxide, molybdenum sulfide, molybdenum selenide, gallium arsenide, indium phosphide, tungsten selenide, tungsten sulfide, zinc oxide and zinc sulfide. The filling agent may comprise one or more of titanium oxide, silicon oxide, calcium oxide, zinc oxide, carbon black, or zirconium oxide. Inhibitors, auxiliary additives, and/or plasticizers may be added to the filler and/or the binder as needed for any particular application. The coating may be a single-layer or multi-layer coating.

The above objects have further been achieved according to the invention in a method of welding a structural steel component coated with an anti-corrosive coating as described above. The welding method involves temporarily applying an external or additional energy to the coating so as to temporarily excite the semiconducting material into a conductive state. Then the actual welding of the structural steel component is carried out using any known welding technique, and particularly electric spot welding, while the semiconducting material is in the conductive state. After the welding has been completed, the semiconducting material returns from the conductive state to a substantially non-conductive state.

According to the invention, the elemental or compound semiconductors are added to the anti-corrosive coating as part of the filler. The semiconductors are only electrically conductive while external energy sufficient to provide the necessary excitation energy is applied to the coating, for example in the form of light or heat. According to the invention this energy is supplied just prior to and/or during the welding process, so that the weldability of such coated sheets is improved. The applied excitation energy is separate from and additional to the energy that is applied for carrying out the welding, particularly because the excitation energy must be applied before the welding can be initiated. Namely, the energized semiconducting material of the coating is brought into a conductive state by the application of the excitation energy just prior to and/or during the welding process per se, so that the welding will not be hampered by insulative effects of the coating.

Preferably the excitation energy, which excites the elemental or compound semiconductors into the state of conductivity, is controlled by the supply of heat during the welding process. In an alternative embodiment, the energy can be applied to the coating in the form of incident radiation or light of an appropriate wavelength corresponding to a photon energy matching the energy band gap of the semiconducting material.

Once the welding process is completed and the external application of an excitation or activation energy is discontinued, the semiconducting materials return to a semiconductive state with a substantial insulating quality. Moreover, when not being welded, the semiconducting materials, and especially silicon, offer corrosion inhibiting characteristics because they can act as an anode for the steel being protected, whereby the steel is protected cathodically from corrosion by the silicon. In addition to this cathodic protection, the semiconducting materials work as corrosion inhibiting oxygen scavengers. As the polymer matrix ages, water and oxygen slowly diffuse through it. The semiconducting materials react with these substances, producing oxides, such as $SiO_2$. Consequently, the concentration of these diffused substances decreases and the corrosion of the substrate is delayed.

The use of silicon as a component of the filler has the particular advantage that high-purity silicon is readily available as a waste product of wafer production in the electronics industry. Cost-effectively obtainable with constant quality, it can be used in the anti-corrosive coating according to the present invention.

With the special coating composition according to the present invention, it is not necessary to use environmentally harmful heavy metals and chromates, as is the case in some prior art anti-corrosive coatings.

DETAILED DESCRIPTION OF PREFERRED EXAMPLE EMBODIMENTS AND OF THE BEST MODE OF THE INVENTION

The anti-corrosive coating according to the invention contains a binder and a filler. Elemental or compound semiconductors are added to another filling agent of the filler, or the filler entirely consists of a semiconductive compound, e.g. titanium oxide. The proportion of the filler in the anti-corrosive coating is calculated or selected so that, on the one hand, the filler will offer adequate corrosion protection for steel substrates through its cathodic protection and its oxygen scavenging capacity without containing a proportion of zinc or iron-phosphide, and on the other hand, the filler will increase the electric conductivity of the anti-corrosive coating sufficiently to achieve good electric weldability of a steel substrate coated therewith, when the coating is exposed to the appropriate external excitation energy.

The proportion of the filler is set between 20 and 97 wt. %. Silicon and germanium are preferably used as elemental semiconductors, and principally any known semiconductive compound, such as titanium dioxide, molybdenum sulphide, molybdenum selenide, gallium arsenide, indium phosphide, tungsten selenide, tungsten sulphide, zinc oxide or zinc sulphide, etc. can be used in the present filler as the semiconducting material. The kind of semiconducting material to be used depends on the requirements of the whole system including the availability, cost, purity, semiconducting properties, characteristic energy band gap, and anti-corrosive properties of the respective semiconducting material. Silicon is especially suitable because of its cathodic protection of steel, and its ability to act as an oxygen scavenger with respect to oxygen and water diffusing into the anti-corrosive coating, and thereby improve the anti-corrosive properties.

Alternatively the following can be used as or in the filler material, e.g. titanium oxide, silicon oxide, calcium oxide, zinc oxide, carbon black or zirconium oxide. Once again, the selection of particular compositions and proportional contents thereof depends on the requirements of the whole system.

When required, appropriate inhibitors such as phosphates, benzoates, silicates, vanadates, tungstates, zirconates, borates, molybdates or similar substances can be added to the filler or the binder to achieve the known functions or provide the known characteristics of such inhibitors.

The binding agents must be adapted to the requirements of the system and must be compatible with the filler material. The following binding agents can be used in quantities between 3 and 80 weight % : epoxy resins, polyurethanes, combinations of epoxy resins and polyurethanes, melamine resins, acrylates, and silicones. These materials can be dissolved in the following solvents: isopropanol, ethylene glycol, butyl acetate, butyl diglycol acetate, butyl diglycol, or phenolic resins, during the preparation of the coating material for application onto the steel substrate.

When required, correctives or auxiliary agents such as cobalt, manganese, naphthenates, polyamines, triethylene tetramine, and polyamide resins can be used as additives. Also, the following substances can be used as plastifiers: dioctyl sebacate, dioctyl phthalate, dioctyl adipate, diethylene glycol dibenzoate, methyl ricinolate, polyester and epoxy resin esterified tricresyl phosphates.

The grain size of the elemental semiconductors or semi-conductive compounds used in the filler is selected between 0.5 and 10 $\mu$m depending on the total desired thickness of the anti-corrosive coating, whereby smaller grains are used for thinner coating layers and larger grains are used for thicker coating layers.

The anti-corrosive coating having a composition according to the present invention can be applied onto a structural steel component in any one of various different manners. As a preliminary step, the steel component is cleaned and degreased using conventional cleaning and degreasing agents, as well as mechanical brushing, scrubbing, sandblasting, or the like if necessary to achieve a clean surface of the steel substrate. Mechanical roughening or chemical etching of the steel surface may also be carried out in order to improve the adhesion of the anti-corrosive coating onto the steel component. The coating composition is prepared by respectively mixing the selected filler materials and the selected binder materials, whereby a dry milling process may be used for the filler materials while a wet blending process may be used for the binder materials. Then, the filler materials are mixed into the binder materials and the resulting coating composition is applied onto the cleaned steel surface by brushing, spraying or dipping.

In the coating composition to be applied onto the steel component, the binder material is in a non-cured or non-polymerized condition, and is therefore a freely flowable liquid. Depending on the type of binder material that is used, a polymerizing agent or cross-linking agent may be mixed with the binder material just before application onto the steel surface, so that curing of the binder material commences when the coating is applied onto the steel surface. Alternatively, depending on the type or composition of the binder material, the curing and hardening of the binder may be brought about by volatilizing a solvent from the binder, for example by heating or baking the coating material after it is applied onto the steel component. Namely, in order to facilitate the application of the prepared composition to the steel surface, the polymeric base material of the binder may be dissolved or thinned with a suitable solvent, which is later volatilized during curing of the coating applied onto the steel substrate.

The mixing of the several binder and filler material components can alternatively be carried out directly in a mixing-type spray nozzle. For example, two components of a two-part binder material such as an epoxy resin and an activator therefor, as well as a powdered mixture of the filler material are supplied through three respective supply lines to a mixing nozzle which then sprays these three constituents in such a manner so as to mix the constituents together, either internally within the spray nozzle, or externally immediately upon leaving the spray nozzle, so that the composition impinging on the surface to be coated is thoroughly mixed.

The final coating may consist of a single layer of the applied coating composition. Alternatively, a plurality of layers of the coating composition can be successively applied with intervening curing periods, so as to build up a thicker total coating. It is also possible according to the invention to use a layer or layers of the inventive coating composition in combination with one or more layers of a different coating composition, to achieve combined protective effects.

Once the surfaces of the steel component have been coated with the present inventive coating composition, the resulting coated steel component will exhibit an excellent corrosion resistance. This corrosive resistance is not diminished when the coated component is subjected to a welding operation, and the coating does not hinder the welding operation. Namely, in order to carry out a welding operation, sufficient and appropriate external energy is applied to the coating so as to activate the semiconducting materials of the coating into an electrically conductive state. Then the welding, such as electric arc or spot welding, is carried out while the coating is in such a conductive state. The externally applied activation energy may be applied in the form of heat, e.g. in a radiant oven or by a torch flame or the like, before the welding is carried out. Alternatively, the externally applied activation energy may be applied in the form of radiant energy, e.g. light having an appropriate wavelength corresponding to a photon energy at least matching the energy band gap of the semiconducting material of the coating, so that the energy of the incident radiation is efficiently adapted to excite electrons of the semiconducting material into an electrically conductive state. A person of ordinary skill in the art will be able to select appropriate wavelengths of incident radiation depending on the particular semiconducting material being used in a given composition of the coating.

An example embodiment of the welding process according to the present invention was carried out on structural steel components coated with an anti-corrosive coating comprising 75 wt. % of a filler of ground silicon, and a binder made up of approximately 15 wt. % of epoxy resin and approximately 10 wt. % of butyl acetate as a solvent, and a commercially available suspension agent, namely "Thixotrol ST" of the Baker Castor Oil company. Alternative or additional suspension agents are substances based on silicon dioxide, modified aluminum silicates, hydrated ricinus oil, and compounds with polyamide structures. Note that weight percentages used herein generally are percentages with respect to the overall or total composition of the coating material.

When the semiconducting filler of the coating comprises silicon, the silicon material is first energized into a conducting state before welding the component, by supplying an external energy providing a photon energy of 1.1 eV for energizing electrons of the silicon from a valence state into a conduction state. The applied energy is preferably an incident radiation, e.g. light, having a wavelength corresponding to the necessary photon energy for exciting the semiconducting material, for example a wave-length just below a threshold of 1.13 $\mu$m (e.g. 0.8 to 1.13 $\mu$m) to provide a photon energy of at least 1.1 eV (e.g. 1.1 to 1.5. eV) in the case of silicon. The light is applied to the intended weldment joint location of the coated steel substrate in order to create the desired electrical conductivity in the anti-corrosive coating, for thereupon carrying out the welding process, e.g. by electric spot welding. Alternatively, a locally induced heating of the coating at the joint location could be used to energize the semiconducting material.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A combination of a corrosion protection coating on a steel component having a welded joint, said coating consisting essentially of from 3 wt. % to 80 wt. % of a binder and from 20 wt. % to 97 wt. % of a filler, wherein said binder comprises a polymeric material, and said filler comprises a semiconducting material that comprises at least one elemental semiconductor selected from the group consisting of silicon and germanium.

2. The combination according to claim 1, wherein said coating excludes all forms of zinc, excludes iron phosphides, excludes chromates, and excludes all forms of heavy metals.

3. The combination according to claim 1, wherein said semiconducting material consists essentially of said at least one elemental semiconductor selected from the group consisting of silicon and germanium.

4. The combination according to claim 1, wherein said semiconducting material further comprises at least one compound semiconductor selected from the group consisting of titanium oxide, molybdenum sulfide, molybdenum selenide, gallium arsenide, indium phosphide, tungsten selenide, tungsten sulfide, zinc oxide and zinc sulfide.

5. The combination according to claim 1, wherein said polymeric material comprises at least one material selected from the group consisting of epoxy resins, polyurethanes, combinations of epoxy resins and polyurethanes, melamine resins, acrylates, and silicones.

6. The combination according to claim 1, wherein said filler further comprises at least one filling agent selected from the group consisting of titanium oxide, silicon oxide, calcium oxide, zinc oxide, carbon black, and zirconium oxide.

7. The combination according to claim 1, wherein at least one of said filler and said binder further comprises at least one inhibitor selected from the group consisting of phosphates, benzoates, silicates, vanadates, tungstenates, zirconates, borates, and molybdates.

8. The combination according to claim 1, wherein at least one of said filler and said binder further comprises at least one auxiliary additive selected from the group consisting of cobalt, manganese, naphthenates, polyamines, triethylene tetramines, and polymer resins.

9. The combination according to claim 1, wherein said binder further comprises at least one plastifier selected from the group consisting of dioctyl sebacate, dioctyl phthalate, dioctyl adipate, diethylene glycol dibenzoate, methyl ricinolate, polyester esterified tricresyl phosphates, and epoxy resin esterified tricresyl phosphates.

10. The combination according to claim 1, wherein said semiconducting material consists essentially of grains of semiconducting material having a grain size in a range from 0.5 $\mu$m to 10 $\mu$m.

11. The combination according to claim 1, wherein said coating is present on said steel component directly at a location of said welded joint and said coating is welded in said welded joint.

12. The combination according to claim 1, wherein said semiconducting material consists essentially of silicon.

13. The combination according to claim 1, wherein said semiconducting material consists essentially of germanium.

14. A method of making the combination according to claim 1, said method comprising the following steps:
   a) providing said corrosion protection coating on said steel component;

b) temporarily exciting said semiconducting material of said coating into a conductive state by applying energy to said coating in a joint area of said component that is to be welded; and c) while said semiconducting material is in said conductive state, welding said component at said joint area to form said welded joint.

15. The method according to claim 14, wherein said applying of energy in said step b) comprises applying heat energy to said coating so as to heat said coating before said welding in said step c).

16. The method according to claim 14, wherein said applying of energy in said step b) comprises applying an incident light onto said coating.

17. The method according to claim 16, wherein said applying of said incident light onto said coating is carried out before said welding in said step c).

18. The method according to claim 16, wherein said applying of said incident light onto said coating is carried out before and during said welding in said step c).

19. The method according to claim 16, wherein said incident light has a wavelength corresponding to a photon energy that is at least equal to an energy gap between a non-conducting state and a conducting state of electrons of said semiconducting material.

20. The method according to claim 19, wherein said semiconducting material comprises said silicon, and said incident light has a wavelength in a range from 0.8 to 1.13 $\mu$m.

21. The method according to claim 14, wherein said step of providing said corrosion protection coating on said steel component comprises providing said steel component, preparing said coating, applying said coating onto said steel component, and curing said coating, and wherein said polymeric material of said binder comprises at least one material selected from the group consisting of epoxy resins, polyurethanes, combinations of epoxy resins and polyurethanes, melamine resins, acrylates, and silicones.

22. The method according to claim 21, wherein said step of preparing said coating comprises dissolving said polymeric material in a solvent selected from the group consisting of isopropanol, ethylene glycol, butyl acetate, butyl diglycol acetate, and butyl diglycol.

* * * * *